(12) United States Patent
Pernice et al.

(10) Patent No.: US 12,670,380 B2
(45) Date of Patent: Jun. 30, 2026

(54) OPTICAL MATRIX MULTIPLICATION UNIT FOR AN OPTOELECTRONIC SYSTEM FOR FORMING AN ARTIFICIAL NEURAL NETWORK

(71) Applicant: WESTFÄLISCHE WILHELMS-UNIVERSITÄT MÜNSTER, Münster (DE)

(72) Inventors: Wolfram Pernice, Münster (DE); Johannes Feldmann, Münster (DE)

(73) Assignee: WESTFÄLISCHE WILHELMS-UNIVERSITÄT MÜNSTER, Münster (DE)

( * ) Notice: Subject to any disclaimer, the term of this patent is extended or adjusted under 35 U.S.C. 154(b) by 585 days.

(21) Appl. No.: 18/044,650

(22) PCT Filed: Sep. 14, 2021

(86) PCT No.: PCT/EP2021/075232
§ 371 (c)(1),
(2) Date: Mar. 9, 2023

(87) PCT Pub. No.: WO2022/058307
PCT Pub. Date: Mar. 24, 2022

(65) Prior Publication Data
US 2023/0342596 A1      Oct. 26, 2023

(30) Foreign Application Priority Data
Sep. 15, 2020      (DE) ..................... 10 2020 124 034.1

(51) Int. Cl.
G06N 3/06        (2006.01)
G06E 3/00        (2006.01)
G06N 3/067       (2006.01)

(52) U.S. Cl.
CPC ........... G06N 3/0675 (2013.01); G06E 3/001 (2013.01)

(58) Field of Classification Search
CPC ................................ G06N 3/094; G06F 3/001
See application file for complete search history.

(56) References Cited

U.S. PATENT DOCUMENTS 3,944,820 A * 3/1976 Stotts ..................... G06E 1/045
                                                            359/107
4,849,940 A    7/1989 Marks, II et al.
                        (Continued)

OTHER PUBLICATIONS

Chinese Office Action (w/ English Translation) for corresponding Application No. 202180067867.7, mailed Mar. 28, 2025, 16 pages.
(Continued)

*Primary Examiner* — Eliyah S. Harper
(74) *Attorney, Agent, or Firm* — Dority & Manning, P.A.

(57) ABSTRACT

An optical matrix multiplication unit for an optoelectronic system can be used to form an artificial neural network, having N input waveguides, M output waveguides and a plurality of matrix multiplication unit cells for signal processing of optical signals of one each of the N input waveguides and for transferring the processed signals into one each of the M output waveguides, wherein each of the matrix multiplication unit cells is allocated to one of the input waveguides and one of the output waveguides and undertakes a unique allocation between said two allocated waveguides. Each of the matrix multiplication unit cells has, for signal processing and signal transfer, a directional coupler, having an electrooptical modulator for transmission control of the directional coupler, interconnected between the allocated input waveguide and the allocated output waveguide.

8 Claims, 2 Drawing Sheets

(56)　　　　　　References Cited

U.S. PATENT DOCUMENTS

| | | | |
|---|---|---|---|
| 10,104,445 | B2 * | 10/2018 | Patel ...................... G11B 27/10 |
| 10,820,066 | B2 * | 10/2020 | Caulfield .............. H04L 65/762 |
| 2006/0239312 | A1 * | 10/2006 | Kewitsch .................. H01S 5/42 |
| | | | 372/29.016 |
| 2017/0351293 | A1 | 12/2017 | Carolan et al. |
| 2019/0370644 | A1 | 12/2019 | Kenney et al. |
| 2020/0084486 | A1 * | 3/2020 | Cho .................. H04N 21/2407 |
| 2020/0110992 | A1 * | 4/2020 | Hosseinzadeh ........ G06N 3/094 |
| 2023/0152667 | A1 * | 5/2023 | Miscuglio .............. G06E 3/005 |
| | | | 359/107 |
| 2023/0342596 | A1 * | 10/2023 | Pernice .................. G06E 3/001 |
| 2024/0241159 | A1 * | 7/2024 | Zakari ...................... G06N 3/04 |

OTHER PUBLICATIONS

International Search Report for Application No. PCT/EP2021/075232, dated Jan. 14, 2022, 4 pages.

* cited by examiner

OPTICAL MATRIX MULTIPLICATION UNIT FOR AN OPTOELECTRONIC SYSTEM FOR FORMING AN ARTIFICIAL NEURAL NETWORK

CROSS-REFERENCE TO RELATED APPLICATIONS

The present application is a US national phase application of International Patent Application Number PCT/EP2021/075232, filed Sep. 14, 2021, which, in turn, is based upon and claims the right of priority to German Patent Application Number 10 2020 124 034.1, filed Sep. 15, 2020, the disclosures of both of which are hereby incorporated by reference herein in their entirety for all purposes.

The invention relates to an optical matrix multiplication unit for an optoelectronic system for forming an artificial neural network, comprising N input waveguides, M output waveguides and a plurality of matrix multiplication unit cells for signal processing of optical signals from each of the N input waveguides and transmitting the respective processed signal in one of the M output waveguides, wherein each of the matrix multiplication unit cells is allocated to one of the input waveguides and one of the output waveguides and provides a unique allocation between these two allocated waveguides.

The invention further relates to a corresponding matrix multiplication unit cell for such an optical matrix multiplication unit and a corresponding optoelectronic system for forming an artificial neural network.

In the realization of artificial neural networks, there is a trend to transfer computationally intensive steps of these neural networks from an electronic realization to a photonic realization. This includes the implementation of matrix multiplications with matrices that are not limited in size. The photonic realization simultaneously reduces the power consumption and increases the switching speed. In this way extremely powerful matrix multiplications are possible that far exceed the performance of current computing systems.

US 2020/0110992 A1 describes an optoelectronic System for forming an artificial neural network comprising an optical matrix multiplication unit comprising N input waveguides, M output waveguides, and a plurality of matrix multiplication unit cells for signal processing optical signals from each of the N input waveguides and for transmitting the respective processed signal into one of the M output waveguides. Each of these matrix multiplication unit cells is allocated to one of the input waveguides and one of the output waveguides and implements a unique allocation between these two allocated waveguides. The unit cells of this optical matrix multiplication unit each include a Mach-Zehnder interferometer and two phase shifters. In addition to the optical matrix multiplication unit, the optoelectronic system comprises a light source unit connected upstream of the optical matrix multiplication unit, a modulation unit interconnected between the light source unit and the matrix multiplication unit, and a sensor unit connected downstream of the matrix multiplication unit. In this system, phase information of the light used is used for the multiplication. The basis for such an approach is the use of coherent (laser) light.

It is the object of the invention to provide measures which make the optoelectronic system more efficient.

According to the invention, the object is achieved by the features of the independent claims. Advantageous embodiments of the invention are provided in the subclaims.

In the optical matrix multiplication unit according to the invention for an optoelectronic system for forming an artificial neural network, which comprises N input waveguides, M output waveguides and a plurality of matrix multiplication unit cells for signal processing of optical signals from each of the N input waveguides and transmitting the respective processed signal into one of the M output waveguides, in which each of the matrix multiplication unit cells is allocated to one of the input waveguides and one of the output waveguides and implements a unique allocation between these two allocated waveguides, it is provided that each of the matrix multiplication unit cells for signal processing and signal transmission comprises a directional coupler interconnected between the allocated input waveguide and the allocated output waveguide and comprising an electro-optical modulator for transmission control of the directional coupler.

In contrast to known optical matrix multiplication units, here the multiplication is carried out via the amplitude of a corresponding multiplication and not by its phase or a phase relationship. The multiplier of the individual multiplication carried out by one of the unit cells corresponds to the amplitude ratio of the optical signal between the corresponding input and output waveguides determined by the modulator settings of the electro-optical modulator of this unit cell.

Such a multiplication based on an amplitude change results in a higher bandwidth, which makes an optoelectronic system comprising such an optical matrix multiplication unit more powerful.

According to a preferred embodiment of the invention, the electro-optical modulator of the respective unit cell is a phase modulator. The electro-optical modulator (EOM) is based on a change of the refractive index. In this process, the refractive index changes by applying an electric field to the doped material. This has the effect of changing the phase position of the light, which means that the light waves are shifted. Examples of such a phase modulator are a Kerr cell and a Pockels cell.

In particular, it is provided that the respective directional coupler comprises a Mach-Zehnder interferometer into which the phase modulator is integrated. The Mach-Zehnder interferometer comprises two signal path arms, in one of which the phase modulator is arranged.

It is particularly preferred that the respective directional coupler further comprises multimode interference couplers for wave splitting at the input and output of the Mach-Zehnder interferometer.

Alternatively to the use of a phase modulator, it is advantageously provided that the electro-optical modulator of the respective unit cells is an absorption modulator. This is also referred to as an electro-absorption modulator (EAM). With such an absorption modulator, the opacity of the optical material used is generally changed depending on an applied voltage.

According to a further preferred embodiment of the invention, the matrix multiplication unit is designed as a semiconductor-based matrix multiplication unit. The most common material for this is silicon.

According to still another preferred embodiment of the invention, the matrix multiplication unit is designed as a matrix multiplication unit based on at least one optically active material. Possible materials include, for example, lithium niobate, aluminum nitride or gallium nitride.

In the matrix multiplication unit cell according to the invention for an aforementioned optical matrix multiplication unit, it is provided that it comprises a directional coupler with an integrated electro-optical modulator for signal processing of optical signals of an input waveguide of the optical matrix multiplication unit and for transmitting the respective processed signal into an output waveguide of the optical matrix multiplication unit.

All of the advantageous embodiments mentioned in connection with the matrix multiplication unit and relating to the configuration of the matrix multiplication unit cells are advantageous designs of the matrix multiplication unit cell itself.

In the optoelectronic system according to the invention for forming an artificial neural network, comprising a light source unit, an optical matrix multiplication unit and a sensor unit, it is provided that the matrix multiplication unit is configured as the aforementioned matrix multiplication unit.

In the following, the invention is explained by way of example with reference to the accompanying drawings based on a preferred exemplary embodiment, wherein the features shown below can represent an aspect of the invention both individually and in combination. In the Figures.

Figure 1:
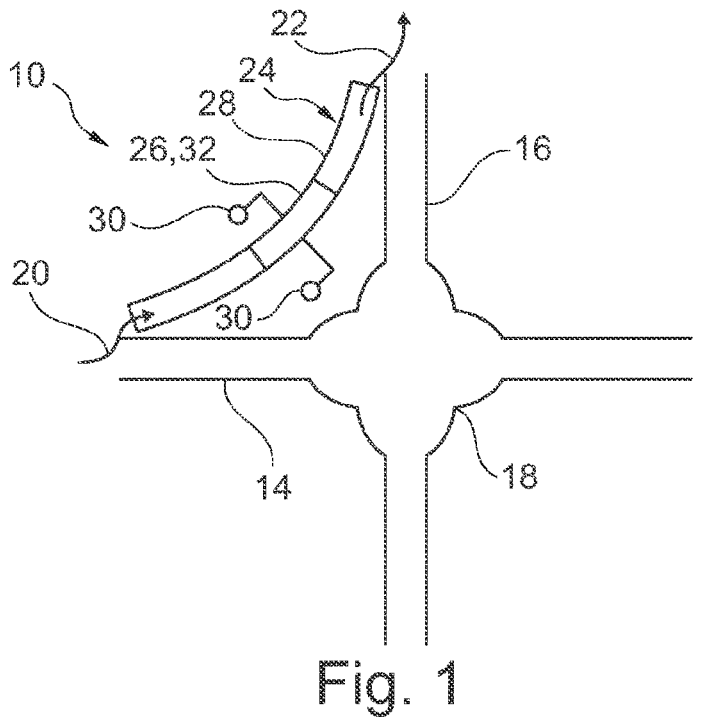
FIG. 1 is a matrix multiplication unit cell for an optical matrix multiplication unit according to a first preferred embodiment of the invention.
Figure 3:
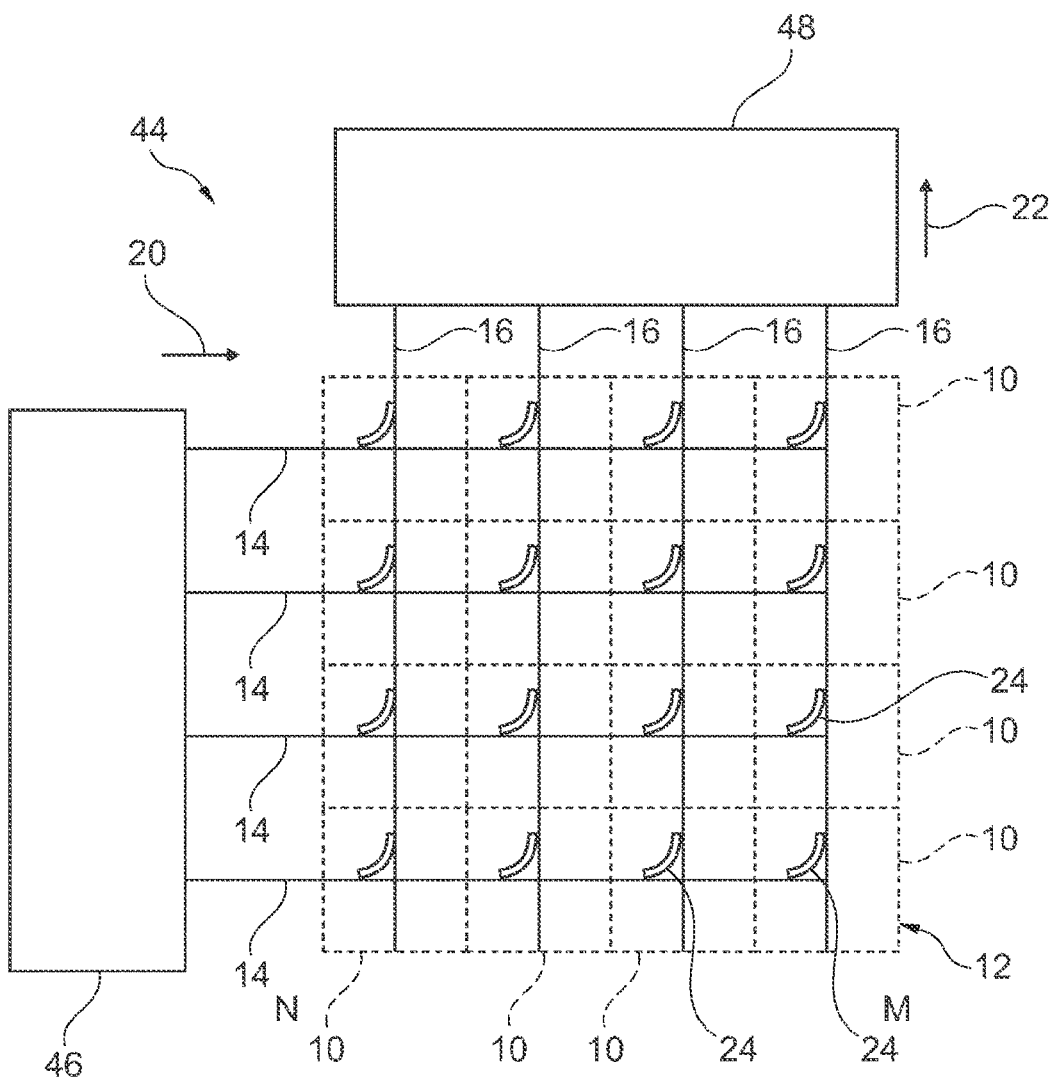
FIG. 3 is an optoelectronic system for forming an artificial neural network comprising an optical matrix multiplication unit according to a preferred embodiment of the invention.

FIG. 1 shows a schematic view of a matrix multiplication unit cell 10 for an optical matrix multiplication unit 12 shown in FIG. 3. In the following, the matrix multiplication unit cell will be referred to only as a unit cell 10 for short. In addition to the actual components of the unit cell 10, a section of an input waveguide 14 allocated to the unit cell 10 and a section of an output waveguide 16 allocated to the unit cell 10 are also shown, respectively. These two input and output waveguides 14, 16 serve to transmit optical signals and intersect each other in the area of the allocated unit cell 10, thus have an intersection point 18. In the illustrations of the figures, input waveguides 14 are drawn horizontally and output waveguide 16 vertically.

The unit cell 10 now comprises for signal processing of the optical signals of the input waveguide 14 (arrows 20) and for transmitting the respective processed signal (arrows 22) into the output waveguide 16, a directional coupler 24 which is interconnected between the input waveguide 14 and the allocated output waveguide 16 and which is equipped with an electro-optical modulator 26 for transmission control of the directional coupler 24. The directional coupler 24 itself serves primarily for signal transmission/signal redirection from the input waveguide 14 into the output waveguide 16 via a signal path 28. Its electro-optical modulator 26 is responsible for the signal processing relating to the multiplication. The electro-optical modulator 26 comprises electrical connections 30. In the example shown in FIG. 1, the electro-optical modulator 26 is specifically designed as an absorption modulator 32, in which the opacity of the optical material used varies depending on a voltage applied to the electrical connections 30. The multiplication in this unit cell 10 results from the optical signal of the input waveguide 14 (arrows 20) and its attenuation by the electro-optical modulator 26 to the processed signal (arrows 22).

Figure 2:
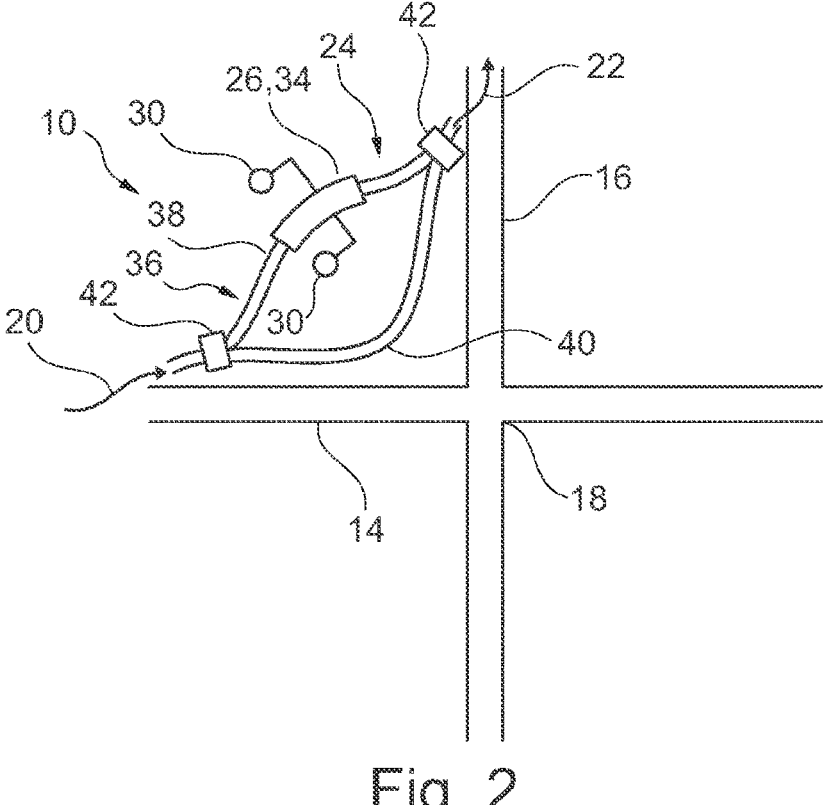
FIG. 2 is a matrix multiplication unit cell for an optical matrix multiplication unit according to a second preferred embodiment of the invention.

FIG. 2 shows a schematic diagram of a variant of the matrix multiplication unit cell 10. Again, in addition to the actual components of the unit cell 10, there is respectively shown a section of an input waveguide 14 allocated to the unit cell 10 and a section of an output waveguide 16 allocated to the unit cell 10. These two input and output waveguides 14, 16 are used for transmitting optical signals and intersect each other in the area of the allocated unit cell 10.

In this variant, too, the unit cell 10 comprises, for signal processing of the optical signals of the input waveguide 14 (arrows 20) and for transmitting the respective processed signal (arrows 22) into the output waveguide 16, a directional coupler 24 which is interconnected between the input waveguide 14 and the allocated output waveguide 24 and which is provided with an electro-optical modulator 26 for transmission control of the directional coupler 24. In the example shown in FIG. 2, the electro-optical modulator 26 is configured as a phase modulator 34. The directional coupler 24 comprises a Mach-Zehnder interferometer 36 in which the signal path 28 splits into two signal path arms 38, 40 in an intermediate section. In one of these signal path arms 38, the phase modulator 34 is located. Furthermore, the directional coupler 24 comprises at the input and output of the Mach-Zehnder interferometer 36 multimode interference couplers 42 (WMI couplers) for wave splitting with respect to the signal path arms 38, 40.

Finally, FIG. 3 shows a schematic diagram of an optoelectronic system 44 for forming an artificial neural network. Here, the assemblies of this optoelectronic system 44 are shown in a kind of block diagram. The individual blocks of this block diagram rather reflect the functional relationships than the spatial structure within the optoelectronic system 44. The necessary control electronics for the controllable components of the individual assemblies are also not shown. The assemblies are (i) the matrix multiplication unit 12, (ii) a light source unit 46 connected upstream of the matrix multiplication unit 12 via N input waveguides 14, and a sensor unit 48 connected downstream of the matrix multiplication unit 12 via M output waveguides 16. In the example shown, N=M=4. Of course, variants with N≠M are also possible, for example N=4 and M=3. The corresponding N light sources of the light source unit 46 and M sensors of the sensor unit 48 are not explicitly shown.

In the following, important aspects of the invention will be restated in other words:

The base of the matrix multiplication unit 12 can be made of semiconductor materials, such as silicon. The matrix itself consists of passive photonic devices for waveguiding, i.e., waveguides 14, 16. These waveguides 14, 16 guide a wide range of wavelengths, particularly in the telecommunications range. The waveguides 14, 16 are arranged in rows and columns. A deterministic transfer of optical power from the row waveguides to the column waveguides is achieved via the directional couplers 24.

The transmission values of the directional couplers 24 encode the matrix elements for the multiplication, i.e., the matrix multiplication unit cells 10. At full transmission, maximum optical power is transferred to the column and the largest value for the matrix element is mapped; at minimum transmission, the smallest matrix element is realized. Any values in between are set by controlling the transmission.

The transmission is controlled by the electro-optical modulators 26, which are used to vary either the real part or the imaginary part of the refractive index. In the case of the real part, the modulator is a phase modulator 34, which is integrated for modulation into the Mach-Zehnder interferometer 36, which is realized by two waveguide arms of equal length (signal path arms 38, 40). The electro-optical phase modulator 34 is integrated into one arm 38. Equal division of the optical power into the two arms 38, 40 is implemented by means of MMI couplers 42. The phase modulator 34 can be implemented e.g. via charge carrier injection into PIN diodes, or also via thermo optical components. Absorption modulators 32 are used to control the imaginary part. On a silicon platform, for example, germanium-based electro-absorption modulators are suitable. These can be modulated at very high speeds in the GHz range and offer a compact design.

Further implementation options are electro-optically active materials, such as lithium niobate, aluminum nitride or gallium nitride. From these materials efficient waveguides 14, 16, as well as efficient electro-optical modulators 26 can be produced. These work via the electro-optical effect and only consume optical power in the switching state. However, they offer a less compact design than silicon-based modulators 26. However, the switching speed can be in the high GHz range. In addition, these materials offer a very broad optical transparency, thus allowing operation in the visible wavelength range, too.

The invention allows matrix vector multiplications to be performed optically and controlled electrically. By using electro-optical modulators 26, very high switching speeds can be achieved without causing material fatigue. This allows the matrix multiplication unit 12 to be configured as often as desired. On the one hand, this allows larger matrices to be generated by reprogramming. On the other hand, the unit cells 10, i.e. the corresponding matrix elements, can also be adjusted over time. This is especially necessary for computational optimization, as well as for machine learning.

High precision is achieved by the use of electro-optical modulators 26. The modulators 26 provide a high dynamic range that can be precisely controlled via the electrical voltage. This enables to adjust the matrix elements with a high degree of accuracy. This also allows the overall result of the matrix multiplication to be very precise, since the optical input power can be precisely controlled. High-precision multiplications are essential for machine learning and can be realized electronically only insufficiently up to now.

The multiplication approach via the combined optical-electronic variant allows enormously high computation rates that cannot be achieved by conventional methods. Due to the reprogrammability, the size of the matrix is not limited, so that it can be effectively scaled according to the invention. At the same time, optical methods offer very high energy efficiency, so that the central challenges of artificial intelligence can be addressed by the method.

REFERENCE SYMBOLS 10 matrix multiplication unit cell
12 matrix multiplication unit
14 input waveguide
16 output waveguide
18 intersection point
20 arrow (signal)
22 arrow (processed signal)
24 directional coupler
26 electro-optical modulator
28 signal path (directional coupler)
30 electrical connection
32 absorption modulator 34 phase modulator
36 Mach-Zehnder interferometer
38 signal path arm
40 signal path arm
42 multimode interference coupler
44 optoelectronic system
46 light source unit
48 sensor unit

The invention claimed is:

1. An optical matrix multiplication unit for an optoelectronic system for forming an artificial neural network, comprising:
   N input waveguides;
   M output waveguides; and
   a plurality of matrix multiplication unit cells for signal processing of optical signals from each of the N input waveguides and for transmitting the respective processed signal into one of the M output waveguides, wherein each of the matrix multiplication unit cells is allocated to one of the input waveguides and one of the output waveguides and implements a unique allocation between these two allocated waveguides,
   wherein each of the matrix multiplication unit cells includes, for signal processing and signal transmission, a directional coupler interconnected between the allocated input waveguide and the allocated output waveguide and comprising an electro-optical modulator for transmission control of the directional coupler, and
   wherein the matrix multiplication unit is configured as a matrix multiplication unit based on at least one optically active material.

2. The matrix multiplication unit according to claim 1, wherein the electro-optical modulator of the respective matrix multiplication unit cell is a phase modulator.

3. The matrix multiplication unit according to claim 2, wherein the respective directional coupler comprises a Mach-Zehnder interferometer in which the phase modulator is integrated.

4. The matrix multiplication unit according to claim 3, wherein the respective directional coupler further comprises: multimode interference couplers for wave splitting at the input and the output of the Mach-Zehnder interferometer.

5. The matrix multiplication unit according to claim 1, wherein the electro-optical modulator of the respective matrix multiplication unit cell is an absorption modulator.

6. The matrix multiplication unit according to claim 1 wherein said matrix multiplication unit is configured as a semiconductor-based matrix multiplication unit.

7. A matrix multiplication unit cell for an optical matrix multiplication unit according to claim 1, wherein said unit cell comprises, for signal processing of optical signals of an input waveguide of the optical matrix multiplication unit and for transmitting the respectively processed signal into an output waveguide of the optical matrix multiplication unit, a directional coupler comprising an integrated electrooptical modulator.

8. An optoelectronic system for forming an artificial neural network, comprising: a light source unit;
   an optical matrix multiplication unit according to claim 1 and a sensor unit.

\* \* \* \* \*